UNITED STATES PATENT OFFICE.

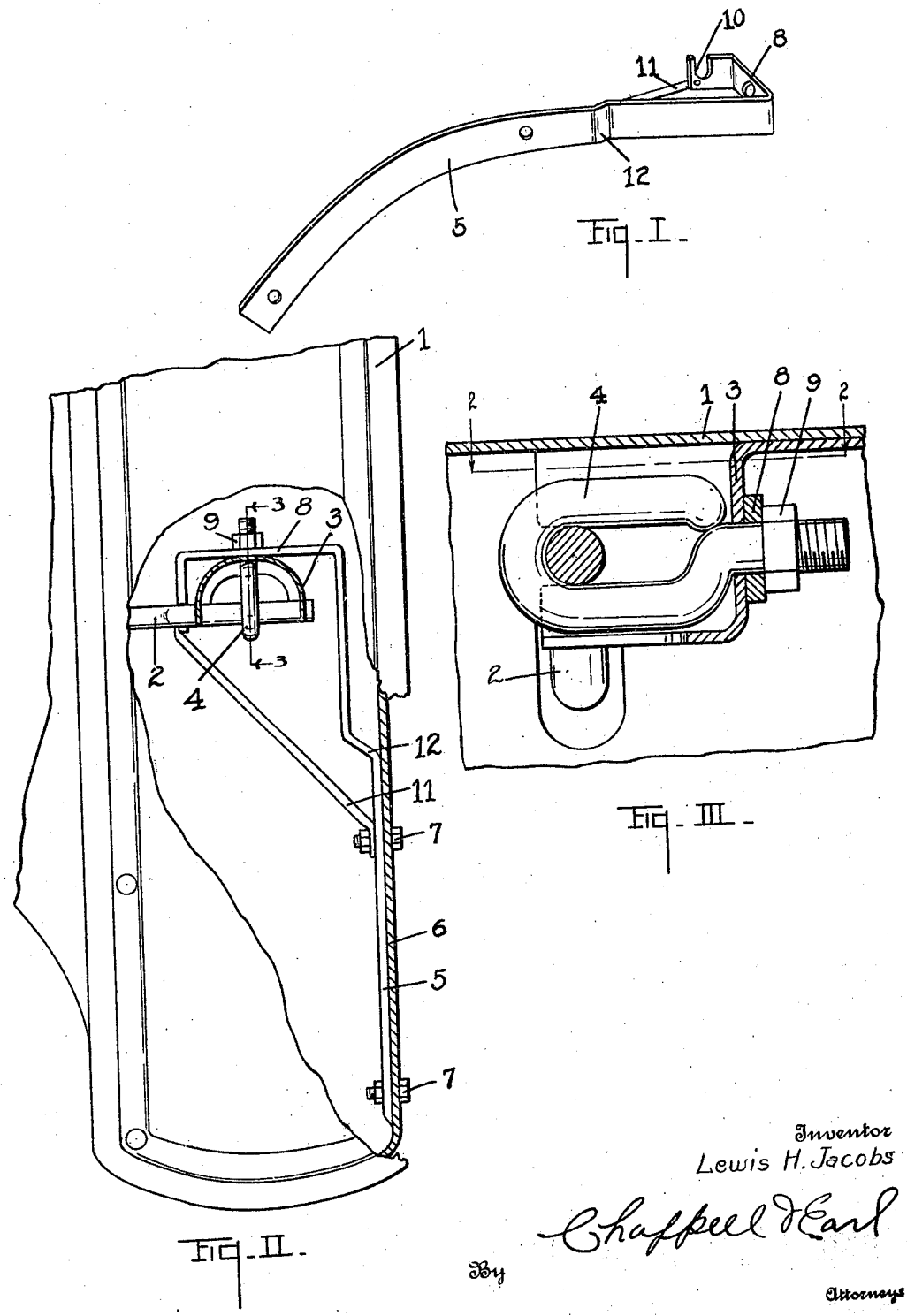

LEWIS H. JACOBS, OF BATTLE CREEK, MICHIGAN.

AUTOMOBILE WHEEL FENDER.

1,413,736.  Specification of Letters Patent.  Patented Apr. 25, 1922.

Application filed August 25, 1921. Serial No. 495,174.

*To all whom it may concern:*

Be it known that I, LEWIS H. JACOBS, a citizen of the United States, residing at Battle Creek, county of Calhoun, State of Michigan, have invented certain new and useful Improvements in Automobile Wheel Fenders, of which the following is a specification.

This invention relates to improvements in automobile wheel fenders.

The main objects of this invention are:

First, to provide an improved fender for automobiles which is supported and reinforced so as to largely eliminate vibration and the danger of breaking the end thereof.

Second, to provide a supporting brace for the rear fenders of Ford automobiles.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of my improved fender brace or support.

Fig. II is a fragmentary plan view of the rear end of a Ford automobile with my improved brace mounted thereon partially in section on a line corresponding to line 2—2 of Fig. III, the fender being also shown in partial section, showing details of the attaching means.

Fig. III is a detail view partially in vertical section on a line corresponding to line 3—3 of Fig. II.

In the drawing similar reference characters refer to similar parts throughout the several views, and the sectional views are taken looking in the direction of the little arrows at the ends of the section lines.

Referring to the drawing, 1 represents the rear fender of an automobile, the fender illustrated being that of a Ford automobile. The fender is supported by the bracket 2 projecting from the body of the car, the fender having on its under side a U-shaped clip 3 disposed with its ends engaging the bracket and clamped thereto by the eye-bolt 4 engaged with the bracket and disposed through the clip. These are the usual parts of the rear fender of a Ford automobile and its support.

My improved brace 5 is formed of a bar, the body portion of the brace being curved to fit within the outer flange 6 of the fender and being secured thereto as by the bolts 7. The brace is provided with an L-shaped inwardly projecting arm 8 at its front end disposed over the clip 3 and engaged by the attaching bolt 4, the nut 9 being removed and the brace arm disposed across the clip and clamped thereto by the nut.

The brace arm is provided with a notch 10 at its inner end which engages the bracket at the inner side of the clip.

I preferably provide a brace rod 11 extending from the end of the brace arm to the forward bolt 7. The body of the brace preferably has an offset 12 therein.

It is common experience that the fenders of automobiles, particularly Ford automobiles, cause a great deal of annoyance by vibrating and rattling the rear fenders, frequently breaking off on account of this vibration crystallizing the metal. Further, they are easily distorted owing to their being made of comparatively thin metal.

My improved brace may be quickly applied and reinforces and supports the fender so that much of the noise is eliminated and the danger of breakage through vibration and crystallization is eliminated, also the fender is stiffened and supported so that it is not so likely to be distorted.

Having thus described my invention, what I claim as new and desire to secure by Letters Patent, is:

1. The combination with a fender supporting bracket, of a fender having a downturned flange at its outer edge, a U-shaped clip on the under side of said fender, an eye-bolt engaged with said bracket and disposed through said clip clamping its arms to said bracket, a brace having a laterally projecting L-shaped arm at one end disposed over said clip and clamped thereon by said bolt, the end of said arm having a notch therein engaging said bracket at the inner side of said clip, said brace having an outwardly offset portion at its outer end secured to the inner side of the fender flange, and a reinforcing rod extending from the inner end of said brace arm to the body of the brace.

2. The combination with a fender supporting bracket, of a fender having a downturned flange at its outer edge, a U-shaped clip on the under side of said fender, an eye-bolt engaged with said bracket and disposed through said clip clamping its arms to said bracket, and a brace having a laterally projecting L-shaped arm at one end disposed over said clip and clamped thereon by said bolt, the end of said arm having a notch therein engaging said bracket at the inner side of said clip, said brace having an outwardly offset portion at its outer end secured to the inner side of the fender flange.

3. The combination with a fender supporting bracket, of a fender, a U-shaped clip on the under side of said fender, an eye-bolt engaged with said bracket and disposed through said clip clamping its arms to said bracket, a brace secured to the under side of the fender and having a laterally projecting L-shaped arm at one end disposed over said clip and clamped thereon by said bolt, the end of said arm having a notch therein engaging said bracket at the inner side of said clip, and a reinforcing rod extending from the inner end of said brace arm to the body of the brace.

4. The combination with a fender supporting bracket, of a fender, a U-shaped clip on the under side of said fender, an eye-bolt engaged with said bracket and disposed through said clip clamping its arms to said bracket, and a brace secured to the under side of the fender and having a laterally projecting L-shaped arm at one end disposed over said clip and clamped thereon by said bolt, the end of said arm having a notch therein engaging said bracket at the inner side of said clip.

5. The combination with a fender supporting bracket, of a fender, an attaching clip on the under side of said fender, a bolt securing said clip to said bracket, and a brace secured to the under side of said fender and having a laterally projecting arm at its forward end disposed over said clip and engaged with said bolt, the end of said arm being engaged with the bracket at the inner side of said clip.

6. The combination with a fender supporting bracket, of a fender, means for attaching said fender to said bracket comprising a bolt, and a brace secured to the under side of said fender to support the outer end thereof and having an arm engaging said bracket and engaged with said bolt.

7. As an article of manufacture, a brace for the rear fenders of Ford automobiles comprising a bar-like body portion having an offset therein adapted to be secured to the inner side of the flange of a fender and an inwardly projecting L-shaped arm adapted to be disposed over the fender attaching clip and engaged with the attaching bolt thereof, the end of said arm having a notch therein adapted to engage the fender supporting bracket, and a reinforcing rod extending from the end of said arm to the body portion of the brace.

8. As an article of manufacture, a brace for the rear fenders of Ford automobiles comprising a bar-like body portion having an offset therein adapted to be secured to the inner side of the flange of a fender and an inwardly projecting L-shaped arm adapted to be disposed over the fender attaching clip and engaged with the attaching bolt thereof, the end of said arm having a notch therein adapted to engage the fender supporting bracket.

In witness whereof, I have hereunto set my hand and seal in the presence of two witnesses.

LEWIS H. JACOBS. [L. S.]

Witnesses:
 NEWMAN A. COBB,
 DAVID A. LIVENSPARGER.